(12) United States Patent
Anderson

(10) Patent No.: US 8,375,798 B2
(45) Date of Patent: Feb. 19, 2013

(54) EXTERNAL PRESSURE MEASURING DEVICE

(76) Inventor: Robert C. Anderson, Vero Beach, FL (US)

( * ) Notice: Subject to any disclaimer, the term of this patent is extended or adjusted under 35 U.S.C. 154(b) by 875 days.

(21) Appl. No.: 12/485,562

(22) Filed: Jun. 16, 2009

(65) Prior Publication Data

US 2009/0308171 A1 Dec. 17, 2009

Related U.S. Application Data

(60) Provisional application No. 61/073,207, filed on Jun. 17, 2008.

(51) Int. Cl.
*G01L 9/04* (2006.01)
(52) U.S. Cl. .............. 73/726; 73/700; 73/756
(58) Field of Classification Search .................. None
See application file for complete search history.

(56) References Cited

U.S. PATENT DOCUMENTS

| | | | | |
|---|---|---|---|---|
| 4,466,290 A * | 8/1984 | Frick | | 73/756 |
| 4,807,479 A * | 2/1989 | Sako et al. | | 73/730 |
| 4,840,068 A * | 6/1989 | Mayhew, Jr. | | 73/730 |
| 5,022,271 A * | 6/1991 | Hannon, Jr. | | 73/730 |
| 5,031,460 A * | 7/1991 | Kanenobu et al. | | 73/730 |
| 5,410,916 A * | 5/1995 | Cook | | 73/706 |
| 5,646,352 A * | 7/1997 | Joseph et al. | | 73/756 |
| 5,753,798 A * | 5/1998 | Engeler et al. | | 73/35.13 |
| 6,450,037 B1 * | 9/2002 | McGuinn et al. | | 73/705 |
| 6,463,813 B1 * | 10/2002 | Gysling | | 73/862.59 |
| 6,558,036 B2 * | 5/2003 | Gysling et al. | | 374/147 |
| 6,676,091 B2 * | 1/2004 | Hauer | | 248/74.3 |
| 6,691,584 B2 * | 2/2004 | Gysling et al. | | 73/861.42 |
| 6,701,790 B2 * | 3/2004 | Fortner et al. | | 73/703 |
| 6,959,604 B2 * | 11/2005 | Bryant et al. | | 73/705 |
| 7,318,353 B2 * | 1/2008 | Chadwell et al. | | 73/856 |
| 7,343,809 B2 * | 3/2008 | Baumann et al. | | 73/728 |
| 7,474,966 B2 * | 1/2009 | Fernald et al. | | 702/25 |
| 2003/0230148 A1 * | 12/2003 | Saxton | | 73/732 |

* cited by examiner

*Primary Examiner* — Lisa Caputo
*Assistant Examiner* — Jermaine Jenkins
(74) *Attorney, Agent, or Firm* — Hodgson Russ LLP

(57) ABSTRACT

An external pressure measuring device having a base and a tubing system bent with various radii. Pressure inside the bent tubing causes the tubing to move in such a way that can be measured and can provide an indication of internal pressure.

17 Claims, 1 Drawing Sheet

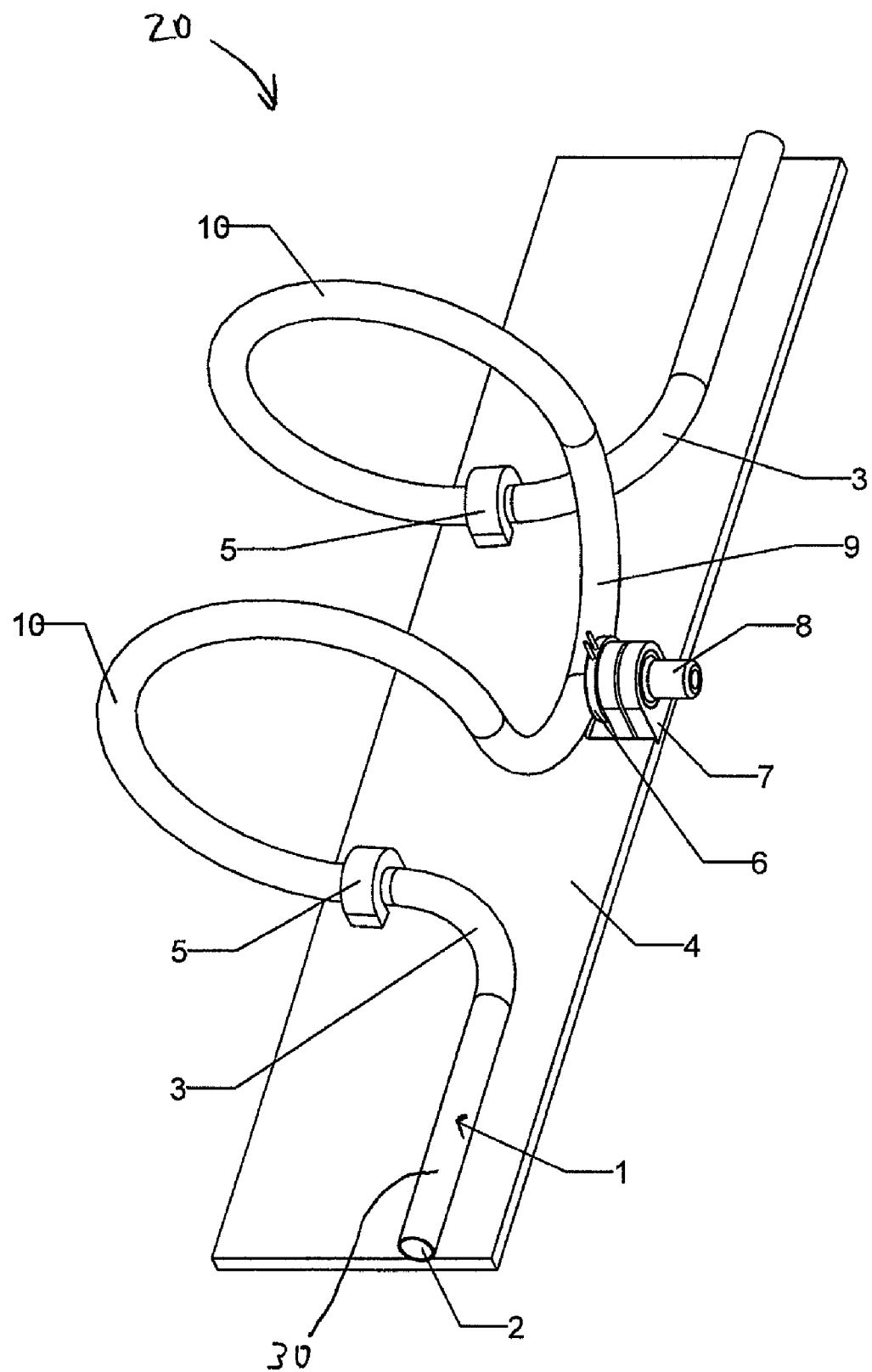

EXTERNAL PRESSURE MEASURING DEVICE

CROSS-REFERENCE TO RELATED APPLICATION

This application claims priority benefit from U.S. Patent Application No. 61/073,207 filed on Jun. 17, 2008, which is incorporated herein by reference.

FIELD OF THE INVENTION

The present invention pertains generally to process fluid conveying systems for industrial processes and specifically to a system for the measurement of pressure within a fluid conveying system.

BACKGROUND OF INVENTION

The introduction of measuring devices into a pipeline typically involves providing an opening in the pipe and installing the measuring device into the port created by the opening. The port has to be sealed to prevent the process fluid from exiting the system. Crevices may be created when using any form of connection that penetrates the pipeline for the purpose of measuring pressure within the pipeline. These crevices create a risk of contaminating the product being conveyed as well as, in some instances, a risk to the environment from leaking toxic materials. In the case of food or pharmaceutical production, these crevices can harbor bacteria. The crevices can also trap old product. For example, in automated paint lines, paint from a previous batch may be trapped in the crevices when the color is changed. Accordingly, what is needed is a device that measures pressure without penetrating the pipe.

SUMMARY OF INVENTION

The present invention meets the above-described need by providing an external pressure measuring device. The device includes a base and a system of tubing bent with various radii. Pressure inside the bent tubing causes the tubing to move or attempt to move in a manner that can be measured and can provide an indication of internal pressure. The device may be used within a process pipeline or it may be used as a bypass with tubing that is smaller than the process tubing. The bypass in the process pipeline directs flow through the device and back to the process pipeline.

BRIEF DESCRIPTION OF THE DRAWING FIGURES

The invention is illustrated in the drawing in which like reference characters designate the same or similar parts throughout the FIGURE:

FIG. 1 is a perspective view of an external pressure measuring device according to the present invention.

DETAILED DESCRIPTION OF THE INVENTION

Turning to the FIGURE, an external pressure measuring device 20 is shown. The device 20 includes a base 4 made of a suitable rigid material. The base 4 supports the system and isolates the tubing such that an accurate measurement of the pressure inside the tubing can be made. The tubing 1 is of a compatible material and appropriately sized for the process tubing to which it is attached. The tubing 1 may be inserted into the process tubing line in the same manner as attaching a "T" connection. The tubing 1 is bent with various radii. A first portion 30 having an inside diameter 2 extends in a straight path and is supported on the base 4. The first portion 30 extends to an elbow portion 3 which in turn extends to a curved portion 10. The curved portion 10 extends from the end of the elbow portion 3 for an arc of approximately two hundred and seventy degrees. The amount of bend at this curved portion 10 may vary significantly depending on the type of tubing and the need for low pressure sensitivity. The curved portion 10 is held in position by a bracket 5. A radiused portion 9 extends between the curved portion 10 and a second curved portion 10. The radiused portion 9 is positioned adjacent to a load cell 6. The load cell 6 is supported by a base 7, and is adjustable by means of a mechanical adjustment mechanism 8 that may include fine threads for positioning the load cell 6 relative to the radiused portion 9. The sensor may comprise other types of sensors such as proximity sensors for detecting movement, strain gauges, or the like. In the case of a load cell sensor 6, as pressure builds inside the process pipeline, the first curved portion 10 will try to return to its original shape and will cause radiused portion 9 to try to move relative to load cell sensor 6. The resultant force provides an indication of the pressure inside the tube. Alternatively, the tube may be allowed to move and a proximity sensor 8 at radiused portion 9 may be used. The proximity sensor 8 detects the movement of radiused portion 9 which is correlated to internal pressure. Alternatively, a strain gauge may be placed on the tubing at the curved portion 10.

The device 20 is designed such that the tubing is secured to the base 4 so that the only movement of the tubing related to internal pressure is in the curved portion 10. It is possible that the device may be repeatable to such an extent that the recording of the calibration parameters during manufacturing would allow field replacement of the electronics for each individual device.

As an alternative in the event that variation of the product rate of flow adversely affects the accuracy of the pressure measurement, the following installation method may be used. The measuring device may be constructed of tubing that is substantially smaller than the process tubing. For example, a two inch process pipeline might have a device with a tubing size as small as one-quarter inch. The viscosity of the product will be the determining factor. This alternative arrangement creates a bypass in the process pipeline that will direct product flow through the device and back to the process pipeline. The integrity of the process is not affected and the effect of the product flow is minimized.

What is claimed is:

1. An external pressure measuring device for connection to a process pipeline having an upstream pipe section and a downstream pipe section, comprising:
   a base;
   a conduit having a circumference about a first axis and having an inlet disposed in fluid communication with the upstream pipe section and having an outlet disposed in fluid communication with the downstream pipe section, the conduit having at least one curved portion being bent about a second axis, the at least one curved portion being capable of elastic movement between a first position and a second position, the first position corresponding to a first measurement of pressure inside the conduit and a second position corresponding to a second measurement of pressure inside the conduit;
   a sensor operatively associated with the at least one curved portion such that the sensor measures the movement of the conduit to determine the pressure inside the conduit.

2. The pressure measuring device of claim 1, wherein the conduit has a first straight portion extending to an elbow portion.

3. The pressure measuring device of claim 1, wherein the conduit has an elbow portion leading to the at least one curved portion.

4. The pressure measuring device of claim 1, wherein the conduit has two curved portions connected by a radiused portion.

5. The pressure measuring device of claim 4, wherein the sensor is a proximity sensor disposed adjacent to the radiused portion.

6. The pressure measuring device of claim 1, wherein the conduit has a smaller diameter than the process pipeline.

7. The pressure measuring device of claim 1, wherein the gauge is a strain gauge.

8. The pressure measuring device of claim 7, wherein the strain gauge senses the motion of the at least one curved portion.

9. The pressure measuring device of claim 1, wherein the at least one curved portion has an arc of approximately two-hundred seventy degrees.

10. An external pressure measuring device for connection to a process pipeline having an upstream pipe section and a downstream pipe section, comprising:
   a base;
   a conduit having an inlet disposed in fluid communication with the upstream pipe section and having an outlet disposed in fluid communication with the downstream pipe section, the conduit having at least one curved portion, the at least one curved portion being capable of elastic movement between a first position and a second position, the first position corresponding to a first measurement of pressure inside the conduit and a second position corresponding to a second measurement of pressure inside the conduit;
   a sensor operatively associated with the at least one curved portion such that the sensor measures the movement of the conduit to determine the pressure inside the conduit;
   wherein the at least one curved portion has an arc of approximately two-hundred seventy degrees.

11. The pressure measuring device of claim 10, wherein the conduit has a first straight portion extending to an elbow portion.

12. The pressure measuring device of claim 10, wherein the conduit has an elbow portion leading to the at least one curved portion.

13. The pressure measuring device of claim 10, wherein the conduit has two curved portions connected by a radiused portion.

14. The pressure measuring device of claim 13, wherein the sensor is a proximity sensor disposed adjacent to the radiused portion.

15. The pressure measuring device of claim 10, wherein the conduit has a smaller diameter than the process pipeline.

16. The pressure measuring device of claim 10, wherein the gauge is a strain gauge.

17. The pressure measuring device of claim 16, wherein the strain gauge senses the motion of the at least one curved portion.

* * * * *